United States Patent Office 3,470,245
Patented Sept. 30, 1969

3,470,245
PREPARATION OF NITRILOTRIACETIC ACID
Philip F. Jackisch, Livonia, Mich., assignor to Ethyl Corporation, New York, N.Y., a corporation of Virginia
No Drawing. Filed Mar. 27, 1967, Ser. No. 625,968
Int. Cl. C07c 101/20, 99/00
U.S. Cl. 260—534         1 Claim

ABSTRACT OF THE DISCLOSURE

Nitrilotriacetic acid is prepared by reacting glycine with carbon monoxide and formaldehyde in the presence of aqueous hydrogen halide. Temperatures employed are from about 150° to about 250° C.; reaction pressures are from about 700 to about 1000 atmospheres.

Background of the invention

Nitrilotriacetic acid can be prepared according to the methods of U.S. 2,855,428 and U.S. 3,061,628. The sodium salt of the acid can be prepared directly; British Patent 976,319. All these methods require HCN which is extremely toxic. The process of this invention does not use HCN and thereby obviates the hazard attendant with use of that compound.

Summary of the invention

Although not bound by any theory, a preferred embodiment of this invention can be illustrated as follows:

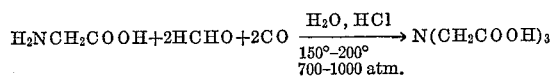

$$H_2NCH_2COOH + 2HCHO + 2CO \xrightarrow[\substack{150°-200° \\ 700-1000 \text{ atm.}}]{H_2O, HCl} N(CH_2COOH)_3$$

The product is a known compound and has the uses known therefor. As an example, it can be transformed into the corresponding trisodium salt which is useful in detergent formulations.

Description of preferred embodiments

Formaldehyde from any source can be employed in the process of this invention. Commercial solutions containing 37 and 50 weight percent formaldehyde are conveniently used. Moreover, the formaldehyde can be made by depolymerizing paraformaldehyde. A convenient depolymerization comprises treating paraformaldehyde with aqueous mineral acid catalyst and then heating. The acid can be hydrochloric or sulfuric. The process of this invention comprises the use of aqueous mineral acid. Thus, the depolymerization can be carried out together with the process of this invention. In other words, paraformaldehyde can be added to the reaction mixture; a pretreatment with aqueous mineral acid to liberate formaldehyde is not required.

As already mentioned, aqueous mineral acid is used in the process. Any non-oxidizing acid having an acid dissociation constant of at least $1 \times 10^{-3}$ can be used. Preferred acids are sulfuric and hydrochloric; however, hydrobromic, orthophosphoric, metaphosphoric and the like can be used if desired. Hydrochloric acid is most preferred.

Preferably, the amount of acid employed is at least 0.05 mole per mole of glycine. There is no real upper limit on the amount of acid, this being defined by such factors as size of reaction vessel, economics, etc. Usually, no useful purpose is served by more than a tenfold excess of acid and good results are achieved with less than a twofold excess. Up to 10 or 100 percent excess of acid is conveniently employed.

Water is used as a reaction medium. In general, the amount of water can be between an amount equal to or up to about 100 times the amount of formaldehyde. The water need not be pure, one or more co-solvents can be present. Applicable co-solvents are those which are stable under the reaction conditions. Illustrative but non-limiting examples are ethanol, methanol, dimethyl Carbitol, acetic acid, 1,2-dimethoxyethane and N,N-dimethyl formamide. These can be admixed with the water and thus it is apparent to a skilled practitioner that alcohols, acids, ethers, halogenated hydrocarbons, and the like are applicable co-solvents.

The water and acid can be added to the reaction mixture as aqueous acid; 6 N or 12 N HCl are examples of applicable acid-water mixtures.

The above equation illustrates that the ratio of glycine: formaldehyde:carbon monoxide is 1:2:2. The process goes when the reactants are used in this ratio but in general, excess amounts of formaldehyde and carbon monoxide favor higher yields. Thus, the reactants are conveniently employed in amounts whereby the molar ratio of formaldehyde and/or carbon monoxide to glycine is as high as 30 to 1. Greater or lesser amounts can be used.

The process is carried out at temperatures high enough to cause the desired reaction but not so high as to cause degradation of the reactants or product. In general, temperatures of from 150°–250° C. can be used. A preferred range is from about 150° to about 200° C. Similarly, pressures high enough to cause a reasonable rate of formation of nitrilotriacetic acid are desirable. Pressures of from about 700 to 1000 atmosphers are employed; somewhat lower or higher pressures can be used.

The pressure vessel should be inert to the reactants and product. Both the mineral acid employed and the product are destructive to some metals. Silver lined vessels are sufficiently inert.

The reaction time is not a truly independent variable but is dependent at least to some extent on the other reaction conditions. In general, the reaction time is inversely proportional to the temperature and pressure. Usually reaction times of from 15 minutes up to 48 hours are sufficient.

The following example is illustrative but not limiting. All parts are by weight.

Example

To a suitable pressure vessel was charged 3.33 parts of glycine, 6.03 parts of paraformaldehyde and about 19 parts of 12 N HCl. The reaction vessel was pressured with carbon monoxide and heated to 150° C. Upon reaching that temperature, the pressure was 11,850 p.s.i.g. After 18.5 hours at 150° C. the pressure was 8500 p.s.i.g.

The vessel was cooled, vented, and discharged. Analysis of the resultant reaction mixture demonstrated that nitrilotriacetic acid had been produced in 21 percent yield.

The product is separable from the reaction mixture by means apparent to a skilled practitioner such as crystallization, distillation, chromatography, etc.

A preferred method is to acidify the reaction mixture and thereby precipitate the product acid (which is the only major constituent insoluble in strong acid solution).

When the reaction is repeated using a temperature of 200° C. and a pressure of 800 atmospheres, similar results are obtained. Similar results also occur when a pressure of 1000 atmospheres is used.

Alkali metal salts of nitrilotriacetic acid are well known sequestering or chelating agents. In addition, the alkali metals salts, particularly trisodium nitrilotriacetate, are useful as builders in detergent formulations. When employed in this manner, the detergent may be selected from anionic synthetic, non-ionic, amphoteric, or zwitter ionic detergents or mixtures thereof. In addition to nitrilotriacetic acid, builders such as inorganic polyphosphates or ethane-1-hydroxyl-1, 1-diphosphoric acid can be used.

There are many useful extensions of the process described above. Typifying these is the production of ethylene diamine tetracetic acid by the reaction of ethylene diamine according to the conditions of the above example. Similarly, under the same condition, methyl amine yields $CH_3N(CH_2COOH)_2$. As can be seen, the process of this invention prepares tertiary amines by substituting a $-CH_2-COOH$ group for a hydrogen attached to a nitrogen atom in a wide variety of amines.

I claim:
1. Process for the preparation of nitrilotriacetic acid, said process comprising reacting glycine, formaldehyde, and carbon monoxide, said process being carried out
   in the presence of water and hydrogen chloride
   at a temperature within the range of from about 150° C. to about 250° C., and
   at a pressure within the range of from about 700 to 1000 atmospheres.

References Cited
UNITED STATES PATENTS

| | | | |
|---|---|---|---|
| 1,946,255 | 2/1934 | Carpenter | 260—532 |
| 2,331,677 | 10/1943 | Hanslick | 260—534 |

LORRAINE A. WEINBERGER, Primary Examiner

A. P. HALLUIN, Assistant Examiner